US010072631B2

(12) United States Patent
Van Asten, II

(10) Patent No.: US 10,072,631 B2
(45) Date of Patent: Sep. 11, 2018

(54) SPIRAL TURBINE BLADE HAVING AT LEAST ONE CONCAVE COMPARTMENT THAT MAY BE ROTATED BY A MOVING FLUID FOR ELECTRICAL ENERGY GENERATION

(71) Applicant: Michael John Van Asten, II, Carmel, IN (US)

(72) Inventor: Michael John Van Asten, II, Carmel, IN (US)

(73) Assignee: Michael John Van Asten II

( * ) Notice: Subject to any disclaimer, the term of this patent is extended or adjusted under 35 U.S.C. 154(b) by 403 days.

(21) Appl. No.: 14/545,882

(22) Filed: Jun. 29, 2015

(65) Prior Publication Data

US 2016/0376894 A1    Dec. 29, 2016

(51) Int. Cl.
*F03D 1/04*    (2006.01)
*F03D 1/06*    (2006.01)
*F03B 17/06*   (2006.01)

(52) U.S. Cl.
CPC .............. *F03B 17/061* (2013.01); *F03D 1/04* (2013.01); *F03D 1/06* (2013.01); *F05B 2240/122* (2013.01); *F05B 2240/30* (2013.01); *F05B 2250/15* (2013.01); *F05B 2250/712* (2013.01); *Y02E 10/28* (2013.01)

(58) Field of Classification Search
CPC .......... F03D 5/005; F03B 3/121; F03B 3/126; F03B 17/061; F05B 2240/122; F05B 2240/242; F05B 2240/243; F05B 2240/30; F05B 2240/33; F05B 2250/15; F05B 2250/712; B63H 2001/122; B63H 2001/125

USPC ................. 415/71, 72, 73, 75; 416/176, 177
See application file for complete search history.

(56) References Cited

U.S. PATENT DOCUMENTS

| 932,628 | A | * | 8/1909 | Meyer | F03D 9/28 |
| | | | | | 416/176 |
| 1,816,971 | A | * | 8/1931 | Hoff | F03B 17/061 |
| | | | | | 415/3.1 |
| 1,851,680 | A | | 3/1932 | Morris | |
| 3,187,816 | A | | 6/1965 | Winter | |
| 4,230,648 | A | | 10/1980 | Leeuwrik | |
| 4,500,259 | A | | 2/1985 | Schumacher | |

(Continued)

FOREIGN PATENT DOCUMENTS

| DE | 102012016202 A1 | 2/2014 |
| WO | 2001048374 A2 | 7/2001 |
| WO | 2001086120 A1 | 11/2001 |

*Primary Examiner* — Logan Kraft
*Assistant Examiner* — Jason Davis

(57) ABSTRACT

A spiral turbine blade having at least one concave compartment that is rotatable by a moving fluid for the generation of electricity is provided. A spiral turbine blade is aligned so that the axis of rotation is generally parallel to the mean direction of a moving fluid. Attached to the intake-facing side of the at least one spiral turbine blade are concave compartments comprised of an intake void, interior space, and exit void. The concave compartments are oriented to capture an additional range of velocity imaginary vectors; specifically those aligned via vortex inducing elements, such as spiral depressions on a conical intake shroud, thereby augmenting the torque induced the spiral turbine blade, and thus improving the conversion efficiency and electrical energy output.

13 Claims, 6 Drawing Sheets

(56) References Cited

U.S. PATENT DOCUMENTS

| | | | |
|---|---|---|---|
| 4,849,647 A | 7/1989 | Mckenzie | |
| 6,053,700 A | 4/2000 | Fosdick | |
| 6,357,997 B1 | 3/2002 | Rosefsky | |
| 7,600,963 B2 | 10/2009 | Miller | |
| 7,911,074 B2 | 3/2011 | Anderson | |
| 8,282,352 B2 * | 10/2012 | Anderson, Jr. | F03B 17/061 |
| | | | 415/4.3 |
| 8,405,240 B2 * | 3/2013 | Ganichot | F03B 13/264 |
| | | | 290/52 |
| 8,764,391 B2 | 7/2014 | Smith | |
| 9,279,407 B2 * | 3/2016 | Sinclaire | E02B 9/08 |
| 9,677,537 B2 * | 6/2017 | Drack | F03D 1/0633 |
| 2008/0238105 A1 | 10/2008 | Ortiz | |
| 2008/0315591 A1 | 12/2008 | Hamann | |
| 2009/0022597 A1 | 1/2009 | Bowie | |
| 2011/0081243 A1 | 4/2011 | Sullivan | |
| 2012/0076656 A1 | 3/2012 | Abass | |
| 2012/0183407 A1 * | 7/2012 | Vallejo | F03D 3/061 |
| | | | 416/228 |
| 2012/0242088 A1 | 9/2012 | Raz | |
| 2013/0156585 A1 * | 6/2013 | Mangano | F03D 3/064 |
| | | | 416/210 R |
| 2013/0177424 A1 | 7/2013 | Webber | |
| 2013/0236314 A1 | 9/2013 | Feiler | |
| 2013/0343891 A1 | 12/2013 | Rajakaruna | |
| 2014/0265337 A1 | 9/2014 | Harding | |
| 2015/0198143 A1 * | 7/2015 | Sandor | F03D 3/065 |
| | | | 416/1 |

* cited by examiner

SPIRAL TURBINE BLADE HAVING AT LEAST ONE CONCAVE COMPARTMENT THAT MAY BE ROTATED BY A MOVING FLUID FOR ELECTRICAL ENERGY GENERATION

TECHNICAL FIELD

The present application relates generally to a hydrokinetic energy converter and particularly to a spiral turbine blade having at least one concave compartment to provide augmented conversion efficiency of a moving fluid to electrical energy.

BACKGROUND OF THE INVENTION

Field of the Invention

In the pursuit of economic and environmentally responsible electrical energy generation, a multitude of processes have been proposed for converting the kinetic energy of moving water to electrical energy. A major issue concerning hydrokinetic generation devices is how to achieve economically feasible conversion efficiency without sacrificing environmental integrity. Early proposals for hydrokinetic turbine converters have been largely hampered by the significant environmental risk that rotating windmill-style turbine blades pose. Additionally, spiral turbine proposals have largely failed to achieve a high enough conversion efficiency to make them economically feasible. Thus, known hydrokinetic turbine converter devices have largely not been viable.

Significant environmental issues have arisen in regards to the operation of hydrokinetic turbines. Hydrokinetic turbines impact the environment through both their mode of operation and the volume of space that they occupy. The rotation of a windmill-style turbine blade poses a direct threat to wildlife through its operation. Although, the inherent operation of a spiral turbine blade does not pose a significant environmental risk, the devices often require a large volume of water in order to achieve economic viability. Due to these environmental issues, support of hydrokinetic turbine generators by environmentally concerned groups and local communities has not been undisputed.

A limiting factor for hydroelectric generation via spiral turbine blade is the volume of moving water and space that the device must utilize in order to achieve economic feasibility. It is therefore advantageous for a hydrokinetic spiral turbine blade that is capable of augmenting the conversion efficiency of the spiral turbine blade, thereby decreasing environmental impact while increasing electrical energy output, and thus making the spiral turbine blade economically viable.

Description of Related Art

Efforts have been made to augment the conversion efficiency of the spiral turbine blade. U.S. Pat. No. 7,938,622 B2 to Anderson discloses a dually tapered helical auger turbine with a perpendicular flange on the blade. The device is capable of generating electricity from multi-directional fluid flows. Additionally, it utilizes pressurized fluid in order to store energy, which can be released during slow output periods to maintain a generally constant electrical supply.

U.S. Patent 20120076656 A1 to Abass discloses a logarithmic spiral turbine blade, which is an improvement on the spiral turbine blade providing augmented conversion efficiency through improved blade design. Although the above specified prior art largely improves the conversion efficiency of the spiral turbine blade, it does not address the problem of failing to utilize those velocity vectors of the moving fluid which are moving generally parallel to the spiral turbine blade.

Hydroelectric generation systems which utilize an induced vortex to improve the conversion efficiency of the apparatus are known. U.S. 20080238105 A1 to Ortiz, Baca, and Wichers discloses a hydrokinetic turbine which utilizes an intake shroud with fixed helical vanes to induce a moving fluid into a vortex before it drives the rotation of a turbine. U.S. Pat. No. 8,764,391 B2 to Smith and Otte discloses a hydrokinetic windmill-style turbine generator that utilizes vortex-inducing blades within an intake shroud to produce a rifling effect on the water stream before it drives the rotation of the turbine blades for electrical production, thereby augmenting conversion efficiency. Although utilizing vortex-inducing apparatuss to augment conversion efficiency are known in the prior art, the problem of capturing the velocity vectors aligned by the induced vortex via spiral turbine blade is not fully addressed.

Prior art which utilizes a modified spiral turbine blade design in order to augment conversion efficiency are known. Patent DE102012016202 A1 to Tischner and Siglbauer describes a spiral turbine blade with profiles to capture an increased amount of hydrokinetic energy, thereby improving the conversion efficiency. Additionally, U.S. patent U.S. 20120242088 A1 to Raz and Eyal describes at least one conical spiral for hydroelectric generation. Patent WO 2001086120 A1 to Marie Claire De Vriendt discloses a spiral turbine blade that utilizes discrete steps to augment the conversion efficiency of the spiral turbine blade. Prior art which increases the range of velocity vectors powering the rotation of a spiral turbine bade are known. However, the prior art does not address the improved utilization of those velocity vectors aligned in a vortex. The prior art does not fully address the conversion efficiency problem, and a spiral turbine blade utilizing concave compartments for capture and channeling of velocity vectors aligned via vortex-inducing apparatus, such as spiral depressions on a conical intake shroud, provides novel improvement to the spiral turbine blade as a hydroelectric generation apparatus.

Although spiral turbine blades which utilize induced vortices and spiral turbine blades which augment conversion efficiency via improved design are known in the prior art, the problem of maximizing conversion efficiency has not been fully addressed and further design improvements are desired for economic viability of the apparatus. The disclosed spiral turbine blade having at least one concave compartment addresses the conversion efficiency problem by utilizing a design which captures and channels an increased range of velocity vectors of a moving fluid, specifically those aligned in an induced vortex, thereby augmenting the conversion efficiency of the spiral turbine blade.

SUMMARY OF THE INVENTION

Therefore, the purpose of the present invention is to improve the spiral turbine blade through augmented conversion efficiency.

A spiral turbine blade having at least one concave compartment is disclosed for use as a device to translate hydrokinetic energy in order to drive a generator for electrical energy production. A spiral turbine blade having at least one concave compartment may include at least one spiral turbine blade. The spiral turbine blade having at least one concave compartment may include at least one concave compartment comprising at least one intake void and at least one interior space. Said at least one concave compartment may be attached to the intake facing side of said at least one spiral turbine blade, and may be oriented so that the at least one intake void captures an additional range of velocity vectors, thereby augmenting the conversion efficiency of the spiral turbine blade. The at least one concave compartment may include at least one exit void. Said at least one exit void may be located within the interior space of the proceeding at least one concave compartment, thereby funneling the moving fluid exiting the upstream at least one concave compartment into said downstream at least one concave compartment. The spiral turbine blade having at least one concave compartment may be geared to a generator either directly or indirectly for electrical energy generation.

The spiral turbine blade having at least one external concave compartment may include at least one intake shroud. Said intake shroud may have spiral depressions and or vanes. The at least one intake void of said at least one external concave compartment may be at least partially oriented to capture velocity imaginary vectors realigned by said at least one vortex inducing device.

The spiral turbine blade having at least one concave compartment may include at least one stationary structure connected directly and or indirectly to said spiral turbine blade. Said at least one stationary structure may stabilize the at least one spiral turbine blade while permitting rotation of said at least one spiral turbine blade within the at least one stationary structure through direct and or indirect harness via ball bearing, magnetic bearing, or other low-friction harness. Said at least one concave structure may be connected to the at least one intake shroud, and may also include interior spiral depressions, vanes, or other vortex-inducing apparatus.

The at least one spiral turbine blade having at least one concave compartment can advantageously convert hydrokinetic energy at a higher efficiency rate than standard spiral turbine blades. Additionally, the spiral turbine blade having at least one concave compartment is designed to achieve higher conversion efficiency through utilization of vortex-inducing elements, thereby aligning velocity vectors of the moving fluid with the at least one intake void of said at least one concave compartment. The at least one spiral turbine blade having at least one concave compartment may be geared to a generator either directly or indirectly for electrical energy generation.

In some arrangements, the spiral turbine blade having at least one concave compartment may include at least one shaft oriented within the central void of the spiral turbine blade. The shaft may be connected to said stationary structure by low-friction harness and supporting connections, thereby allowing for rotation of the at least one shaft within said stationary structure. The spiral turbine blade may have voids to allow for its rotation without interference by said stationary structure and or said at least one low-friction harness. In a particular embodiment, the at least one concave compartment may have dynamic dimensions, in which increased pressure causes expansion of said at least one concave compartment through elastic design and or telescopic mechanism.

The plurality of pieces comprising the at least one spiral turbine blade having at least one concave compartment may be composed of plastics, metal, rubber, carbon fiber, and or other suitable material, and additionally may be hollow or partially hollow. The at least one spiral turbine blade having at least one concave compartment may be filled with foam or other buoyant material in order to augment stability of the apparatus within a moving fluid. The at least one spiral turbine blade having at least one concave compartment may have at least one buoyant structure attached directly and or indirectly to said at least one stationary structure. The pieces of the spiral turbine blade having at least one concave compartment may have generally rounded edges to reduce turbulence and protect wildlife. The spiral turbine blade having at least one concave compartment may be stabilized by connection to buoyant devices, seafloor, land, oil rigs, and or other suitable structure. The at least one stationary structure and or at least one intake shroud may have exterior fins in order to maintain stabilization of the at least one spiral turbine blade having at least one concave compartment within a moving fluid. There may be a multitude of at least one spiral turbine blades having at least one concave compartment utilized in order to augment electrical generation. The spiral turbine blade having at least one concave compartment may include at least one grille to deter wildlife and debris too large to pass through safely. The void dimensions of said at least one grille are lesser than the dimensions of said at least one exit void.

In some arrangements, the at least one spiral turbine blade having at least one concave compartment may include at least one spiral turbine blade, in which said at least one spiral turbine blade has voids or disjunctions to permit wildlife and debris to pass through unhindered. In another embodiment of the present spiral turbine blade having at least one concave compartment, said at least one spiral turbine blade may increase or decrease at a logarithmic or constant rate both in radial width and frequency of rotations around the axis of rotation per length of the axis of rotation.

In one particular embodiment of the present invention, a spiral turbine blade having at least one concave compartment that is rotatable by a moving fluid for the generation of electricity is provided. The spiral turbine blade having at least one concave compartment may include at least one spiral turbine blade, the rotational axis of which is generally parallel to the direction of the moving fluid prior to interaction with the apparatus. Said spiral turbine blade may be comprised of a multitude of pieces, and may increase or decrease at a logarithmic or constant rate in number of rotations around the axis of rotation per length of the rotational axis and in radial width. Additionally, said spiral turbine blade may have a radial width which tapers to a rounded point at the intake end of the apparatus with respect to the direction of said moving fluid. The spiral turbine blade having at least one concave compartment may include at least one concave compartment connected to the intake-facing side of said spiral turbine blade with respect to the direction of the moving fluid. Said at least one concave compartment is comprised of at least one intake void and at least one interior space. Said at least one concave compartment is connected to the intake-facing side of the at least one spiral turbine blade with said at least one intake void. The at least one concave compartment may have at least one exit void that is less than or equal in area to said at least one intake void. The at least one concave compartment may be aligned so that a moving fluid exiting said at least one exit void of an upstream at least one concave compartment is channeled towards the at least one intake void of the downstream at least one concave compartment. Said spiral turbine blade having at least one concave compartment may include at least one generator powered by the rotation of the spiral turbine blade directly or indirectly for electrical energy generation. The spiral turbine blade having at least one concave compartment is rotatable by a moving fluid to facilitate electrical energy generation via the generator.

In another embodiment of the present invention, a spiral turbine blade having at least one concave compartment that is rotatable by a moving fluid for the generation of electricity is provided. The spiral turbine blade having at least one concave compartment may include at least one spiral turbine blade, the rotational axis of which is generally parallel to the direction of the moving fluid prior to interaction with the apparatus. Said spiral turbine blade may be comprised of a multitude of pieces, and may increase or decrease at a logarithmic or constant rate in number of rotations around the axis of rotation per length of the rotational axis and in radial width. Additionally, said spiral turbine blade may have a radial width which tapers to a rounded point at the intake end of the apparatus with respect to the direction of said moving fluid. The spiral turbine blade having at least one concave compartment may include at least one concave compartment connected to the intake-facing side of said spiral turbine blade with respect to the direction of the moving fluid. Said at least one concave compartment is comprised of at least one intake void and at least one interior space. Said at least one concave compartment is connected to the intake-facing side of the at least one spiral turbine blade with said at least one intake void. The at least one concave compartment may have at least one exit void that is less than or equal in area to said at least one intake void. The at least one concave compartment may be aligned so that a moving fluid exiting said at least one exit void of an upstream at least one concave compartment is channeled towards the at least one intake void of the downstream at least one concave compartment. The spiral turbine blade having at least one concave compartment may include at least one shaft, which is rotatable by said spiral turbine blade having at least one concave compartment. The spiral turbine blade having at least one concave compartment may include at least one stationary structure that has an internal void diameter greater than the width of said spiral turbine blade. The at least one stationary structure connects said at least one shaft via at least one low-friction harness allowing for the free rotation of said spiral turbine blade and said at least one shaft within the at least one stationary structure. Said spiral turbine blade may have voids to accommodate the stationary supports between said at least one low-friction harness and said at least one stationary structure. Said moving fluid powers the rotation of the spiral turbine blade having at least one concave compartment, thereby inducing rotation of said at least one shaft, which may then be coupled to a generator for the production of electricity. The spiral turbine blade having at least one concave compartment is rotatable by a moving fluid to facilitate electrical generation via the generator.

In one particular embodiment of the present invention, a spiral turbine blade having at least one concave compartment that is rotatable by a moving fluid for the generation of electricity is provided. The spiral turbine blade having at least one concave compartment may include at least one spiral turbine blade, the rotational axis of which is generally parallel to the direction of the moving fluid prior to interaction with the apparatus. Said spiral turbine blade may be comprised of a multitude of pieces, and may increase or decrease at a logarithmic or constant rate in number of rotations around the axis of rotation per length of the rotational axis and in radial width. Additionally, said spiral turbine blade may have a radial width which tapers to a rounded point at the intake end of the apparatus. The spiral turbine blade having at least one concave compartment may include at least one concave compartment connected to the intake-facing side of said spiral turbine blade with respect to the direction of the moving fluid. Said at least one concave compartment is comprised of at least one intake void and at least one interior space. Said at least one concave compartment is connected to the intake-facing side of the at least one spiral turbine blade with said at least one intake void aligned so that at least one imaginary vector from a point of intersection of an imaginary line tangent with the circular profile of said at least one spiral turbine blade and an imaginary plane perpendicular to the mean moving fluid direction directly to at least one second point within the most proximal downstream at least one intake void forms an angle with said imaginary line tangent to the circular profile of the at least one spiral turbine blade that is between 0° and 90°, in which said imaginary vector is positive with respect to the moving fluid direction. The at least one concave compartment may be attached to the spiral turbine blade, forming an angle with the plane of said spiral turbine blade greater than 0° and less than 180° degrees. The at least one concave compartment may have at least one exit void that is less than or equal in area to said at least one intake void. The at least one concave compartment may be aligned so that a moving fluid exiting said at least one exit void of an upstream at least one concave compartment is channeled towards the at least one intake void of the downstream at least one concave compartment. The spiral turbine blade having at least one concave compartment may include at least one shaft, which is rotatable by said spiral turbine blade having at least one concave compartment. The spiral turbine blade having at least one concave compartment may include at least one stationary structure with an internal void diameter greater than the diameter of said spiral turbine blade. The at least one stationary structure connects said at least one shaft via at least one low-friction harness allowing for the free rotation of said spiral turbine blade and said at least one shaft within the at least one stationary structure. Said spiral turbine blade may have voids to accommodate the supports between said at least one low-friction harness and said at least one stationary structure. The spiral turbine blade having at least one concave compartment may include at least one intake shroud. Said intake shroud may be conical, with the open end of lesser diameter is connected to the intake end of said at least one stationary structure. Said intake shroud may have at least one spiral depression, vane, and or other vortex-inducing apparatus, thereby further aligning the velocity vectors of said moving fluid with the at least one intake void of the concave compartment, resulting in augmented conversion efficiency. Said moving fluid enters the intake shroud in which said at least one vortex-inducing apparatus at least partially aligns the velocity vectors of said moving fluid before it is directed into said at least one stationary structure, within which the spiral turbine blade having at least one concave compartment is rotatable by the moving fluid to facilitate generation of electricity via the interconnected generator. Said spiral turbine blade having at least one concave compartment may include at least one generator powered by the rotation of the spiral turbine blade directly and or indirectly for electrical generation.

In a different embodiment of the present invention, a spiral turbine blade having at least one concave compartment that is rotatable by a moving fluid for the generation of electricity is provided. The spiral turbine blade having at least one concave compartment may include at least one spiral turbine blade, the rotational axis of which is generally parallel to the direction of the moving fluid prior to interaction with the apparatus. Said spiral turbine blade may be comprised of a multitude of pieces, and may increase or decrease at a logarithmic or constant rate in number of rotations around the axis of rotation per length of the rotational axis and in radial width. Additionally, said spiral turbine blade may have a radial width which tapers to a rounded point at the intake end of the apparatus. The spiral turbine blade having at least one concave compartment may include at least one concave compartment connected to the intake-facing side of said spiral turbine blade with respect to the direction of the moving fluid. Said at least one concave compartment is comprised of at least one intake void and at least one interior space. Said at least one concave compartment is connected to the intake-facing side of the at least one spiral turbine blade with said at least one intake void aligned so that at least one imaginary vector from a point of intersection of an imaginary line tangent with the circular profile of said at least one spiral turbine blade and an imaginary plane perpendicular to the mean moving fluid direction directly to at least one second point within the most proximal downstream at least one intake void forms an angle with said imaginary line tangent to the circular profile of the at least one spiral turbine blade that is between 0° and 90°, in which said imaginary vector is positive with respect to the moving fluid direction. The at least one concave compartment may be attached to the spiral turbine blade, forming an angle with the plane of said spiral turbine blade greater than 0° and less than 180° degrees. The at least one concave compartment may have at least one exit void that is less than or equal in area to said at least one intake void. The at least one concave compartment may be aligned so that a moving fluid exiting said at least one exit void of an upstream at least one concave compartment is channeled towards the at least one intake void of the downstream at least one concave compartment. The spiral turbine blade having at least one concave compartment may include at least one shaft connected to the outer perimeter of said spiral turbine blade. The spiral turbine blade having at least one concave compartment may include at least one stationary structure with an inner diameter greater than the outer diameter of the at least one shaft. The contact between the inner wall of the at least one stationary structure and the outer perimeter of the at least one shaft may be ball-bearing, magnetic bearing, or other low-friction harness suitable to allow the rotation of the at least one shaft within the stationary at least one stationary structure with minimal friction. The spiral turbine blade having at least one concave compartment may include at least one intake shroud with the end of smaller inner diameter connected to the end of said at least one stationary structure most proximal to the intake with respect to the direction of said moving fluid. Said intake shroud may have at least one spiral depression, vane, and or other vortex-inducing apparatus to induce the moving fluid into a vortex, thereby aligning an augmented percentage of velocity vectors of the moving fluid with the at least one intake void of the at least one concave compartment. Said spiral turbine blade having at least one concave compartment may include at least one generator to be powered by the rotation of the spiral turbine blade having at least one concave compartment directly and or indirectly for electrical generation. Said moving fluid enters the at least one intake shroud in which said at least one vortex-inducing apparatus said spiral depressions induce the moving fluid into a vortex before it is directed into said at least one shaft, within which the spiral turbine blade having at least one concave compartment is rotatable by the moving fluid to facilitate generation of energy via the interconnected generator.

The above-described and other features and advantages of the present disclosure will be appreciated and understood by those skilled in the art from the following detailed description, drawings, and claims.

DETAILED DESCRIPTION OF THE INVENTION

Exemplary embodiments of the present invention are described below with reference to the figures of the drawings. It is intended that the embodiments and Figures disclosed herein are to be considered illustrative rather than restrictive. Each example is provided by way of explanation of the invention, not limitation of the invention. In fact, it will be apparent to those skilled in the art that various modifications and variations can be made in the present invention without departing from the scope or spirit of the invention.

Figure 1:
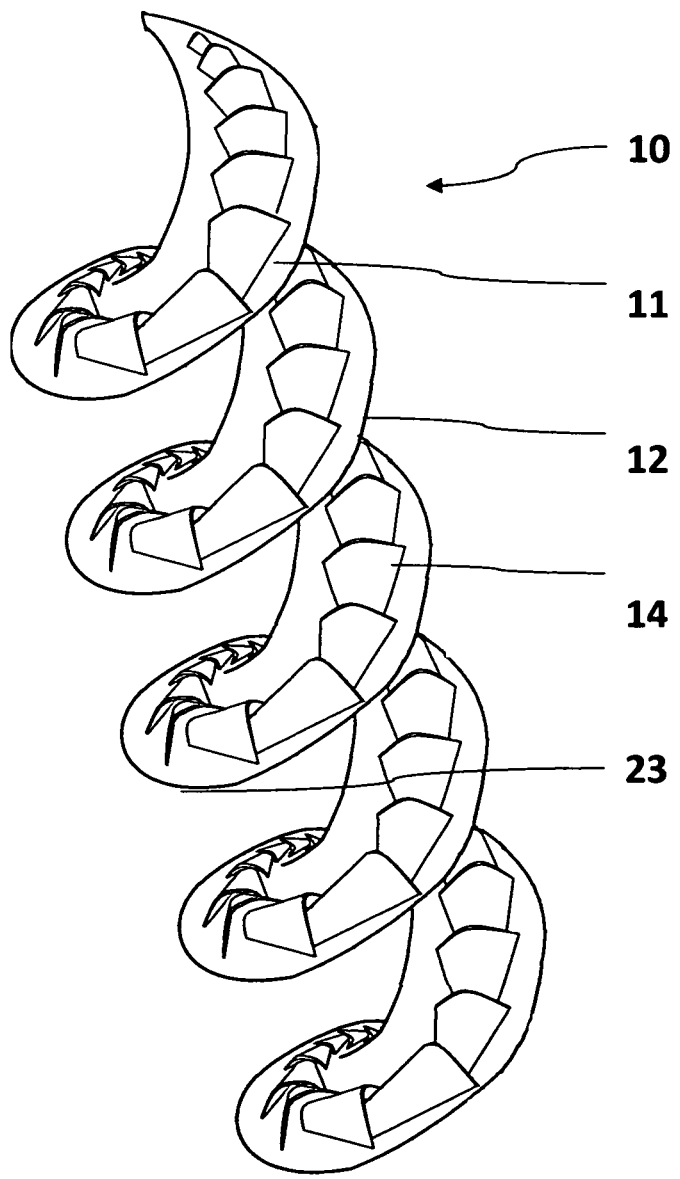
FIG. 1 is a perspective view of an embodiment of the spiral turbine blade having at least one concave compartment.

FIG. 1 illustrates a perspective view of the spiral turbine blade having at least one concave compartment 10. The spiral turbine blade having at least one concave compartment 10 consists of a plurality of components. One of these components is at least one spiral turbine blade 12. Attached to the side of the at least one spiral turbine blade 12 which faces the oncoming moving fluid is at least one concave compartment 11. The at least one concave compartment 11 may include at least one intake void 14 and at least one interior space 23. The at least one concave compartment 11 may be oriented so that the at least one intake void 14 is aligned to capture an augmented range of velocity vectors of the moving fluid. Said at least one concave compartment 11 is connected to the intake-facing side of the at least one spiral turbine blade 12. The at least one concave compartment 11 may have at least one exit void 15 that is less than or equal in total area to said at least one intake void 14. Said at least one exit void 15 may be oriented so that the moving fluid exiting is channeled towards the at least one intake void 14 of the most proximal at least one concave compartment 11 downstream if one is present.

Figure 2:
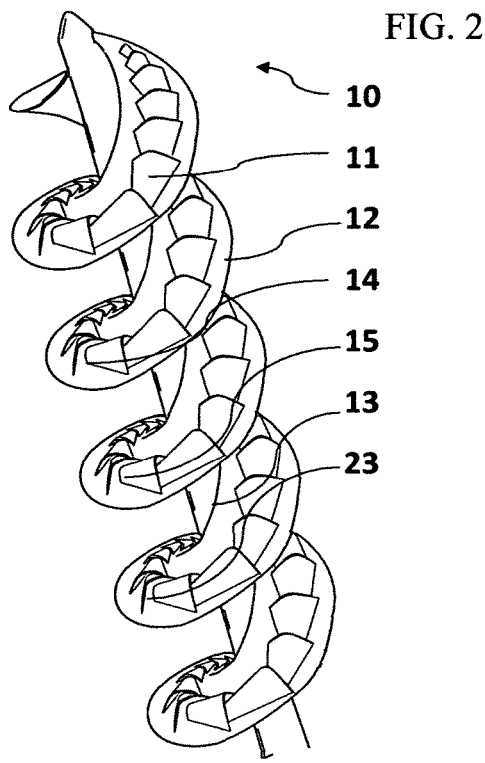
FIG. 2 is a perspective view of an alternate embodiment of the spiral turbine blade having at least one concave compartment.

FIG. 2 illustrates a perspective view of the spiral turbine blade having at least one concave compartment 10. The spiral turbine blade having at least one concave compartment 10 consists of a plurality of components. One of these components is at least one spiral turbine blade 12. Attached to the side of the at least one spiral turbine blade 12 which faces the oncoming moving fluid is at least one concave compartment 11. The at least one concave compartment 11 may include at least one intake void 14 and at least one interior space 23. The at least one concave compartment 11 may be oriented so that the at least one intake void 14 is aligned to capture an augmented range of velocity vectors of the moving fluid. Said at least one concave compartment 11 is connected to the intake-facing side of the at least one spiral turbine blade 12 with said at least one intake void 14. The at least one concave compartment 11 may have at least one exit void 15 that is less than or equal in total area to said at least one intake void 14. Said at least one exit void 15 may be oriented so that the moving fluid exiting is channeled towards the at least one intake void 14 of the most proximal at least one concave compartment 11 downstream if one is present. Said at least one spiral turbine blade 12 may be attached to at least one shaft 13.

Figure 3:
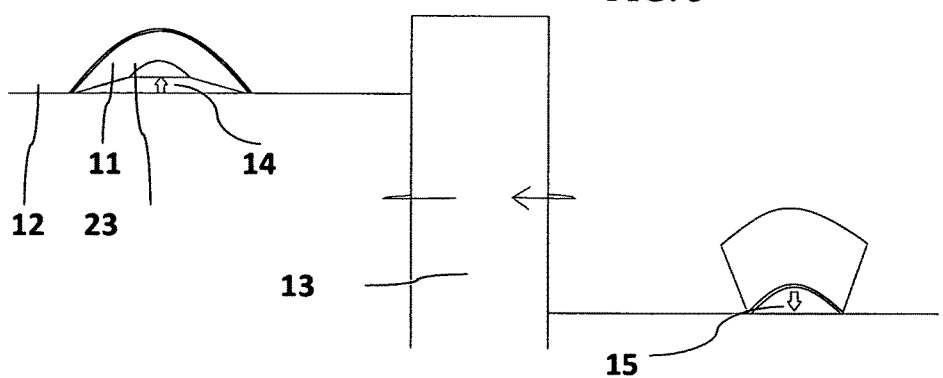
FIG. 3 is a cross-sectional diagrammatic and operational view of the spiral turbine blade having at least one concave compartment

FIG. 3 illustrates a cross-sectional diagrammatic and operational view of an embodiment of the spiral turbine blade having at least one concave compartment 10. The spiral turbine blade having at least one concave compartment 10 consists of a plurality of components. One of these components is at least one spiral turbine blade 12. Attached to the side of the at least one spiral turbine blade 12 which faces the oncoming moving fluid is at least one concave compartment 11. The at least one concave compartment 11 may include at least one intake void 14 and at least one interior space 23. The at least one concave compartment 11 may be oriented so that the at least one intake void 14 is aligned to capture an augmented range of velocity vectors of the moving fluid. Said at least one concave compartment 11 is connected to the intake-facing side of the at least one spiral turbine blade 12 with said at least one intake void 14. The at least one concave compartment 11 may have at least one exit void 15 that is less than or equal in total area to said at least one intake void 14. Said at least one exit void 15 may be oriented so that the moving fluid exiting is channeled towards the at least one intake void 14 of the most proximal at least one concave compartment 11 downstream if one is present. Said at least one spiral turbine blade 12 may be attached to an at least one shaft 13.

Figure 4:
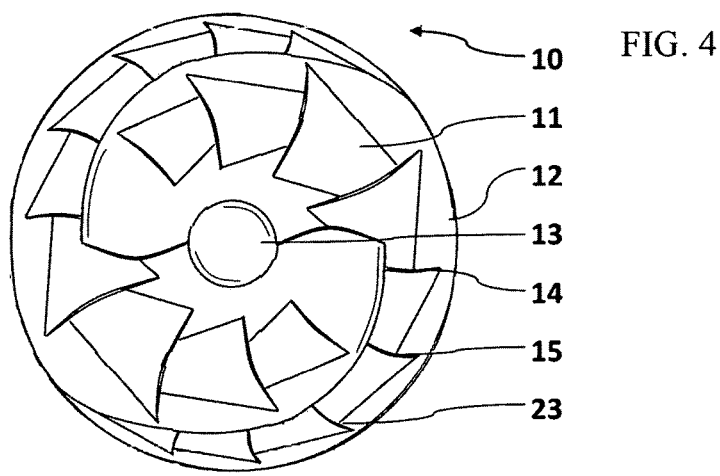
FIG. 4 is a perspective view of the intake end of an alternate embodiment of the spiral turbine blade having at least one concave compartment.

FIG. 4 illustrates a perspective view of the intake end of an alternate embodiment of the spiral turbine blade having at least one concave compartment 10. The spiral turbine blade having at least one concave compartment 10 consists of a plurality of components. One of these components is at least one spiral turbine blade 12. Attached to the side of the at least one spiral turbine blade 12 which faces the oncoming moving fluid is at least one concave compartment 11. The at least one concave compartment 11 may include at least one intake void 14 and at least one interior space 23. The at least one concave compartment 11 may be oriented so that the at least one intake void 14 is aligned to capture an augmented range of velocity vectors of the moving fluid. Said at least one concave compartment 11 is connected to the intake-facing side of the at least one spiral turbine blade 12 with said at least one intake void 14. The at least one concave compartment 11 may have at least one exit void 15 that is less than or equal in total area to said at least one intake void 14. Said at least one exit void 15 may be oriented so that the moving fluid exiting is channeled towards the at least one intake void 14 of the most proximal at least one concave compartment 11 downstream if one is present. The at least one spiral turbine blade 12 may be attached to an at least one shaft 13, thereby causing the at least one shaft 13 to rotate when said moving fluid drives the rotation of the at least one spiral turbine blade 12.

Figure 5:
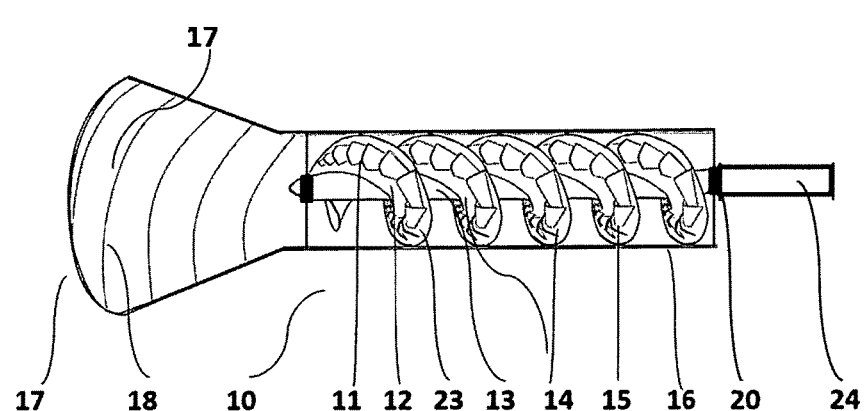
FIG. 5 is a cross-sectional perspective view of an alternate embodiment of the spiral turbine blade having at least one concave compartment

FIG. 5 illustrates a cross-sectional perspective view of an alternate embodiment of the spiral turbine blade having at least one concave compartment 10. The spiral turbine blade having at least one concave compartment 10 consists of a plurality of components. One of these components is at least one spiral turbine blade 12. Attached to the side of the at least one spiral turbine blade 12 which faces the oncoming moving fluid is at least one concave compartment 11. The at least one concave compartment 11 may include at least one intake void 14 and at least one interior space 23. The at least one concave compartment 11 may be oriented in a generally helical pattern along the at least one spiral turbine blade 12, which allows the moving fluid to enter the at least one interior space 23. Said at least one concave compartment 11 is connected to the intake-facing side of the at least one spiral turbine blade 12 with said at least one intake void 14. The at least one concave compartment 12 may have at least one exit void 15 that is less than or equal in total area to said at least one intake void 14. Said at least one exit void 15 may be oriented so that moving fluid passing through is directed towards the at least one intake void 14 of the most proximal at least one concave compartment 11 downstream if one is present. The at least one spiral turbine blade 12 may be attached to an at least one shaft 13, thereby causing the at least one shaft 13 to rotate when said moving fluid drives the rotation of the at least one spiral turbine blade 12. The at least one shaft 13 may then be geared to a generator 24, either directly or indirectly, for the production of electrical energy. Said at least one shaft 13 may be secured by a ball-bearing, magnetic, or other low-friction harness 20, which may then be attached to at least one stationary structure 16. Said low-friction harness 20 allows for the at least one spiral turbine blade 12 to rotate with minimal resisting friction while said at least one stationary structure 16 maintains its position. The at least one stationary structure 16 may then be connected to at least one intake shroud 17, thereby augmenting the velocity of the moving fluid entering the at least one stationary structure 16. The at least one intake shroud 17 may include at least one spiral depression, vane, or other mechanical apparatus 18 for inducing a vortex on a moving fluid along its interior wall, thereby inducing the moving fluid into a vortex as it passes through the intake shroud 17. By inducing said moving fluid into a vortex, more of the velocity vectors of said moving fluid are aligned with the at least one intake void 14 of the at least one concave compartment 11, thereby augmenting the torque induced on said at least one spiral turbine blade 12 by the at least one concave compartment 11, and thus augmenting conversion efficiency.

Figure 6:
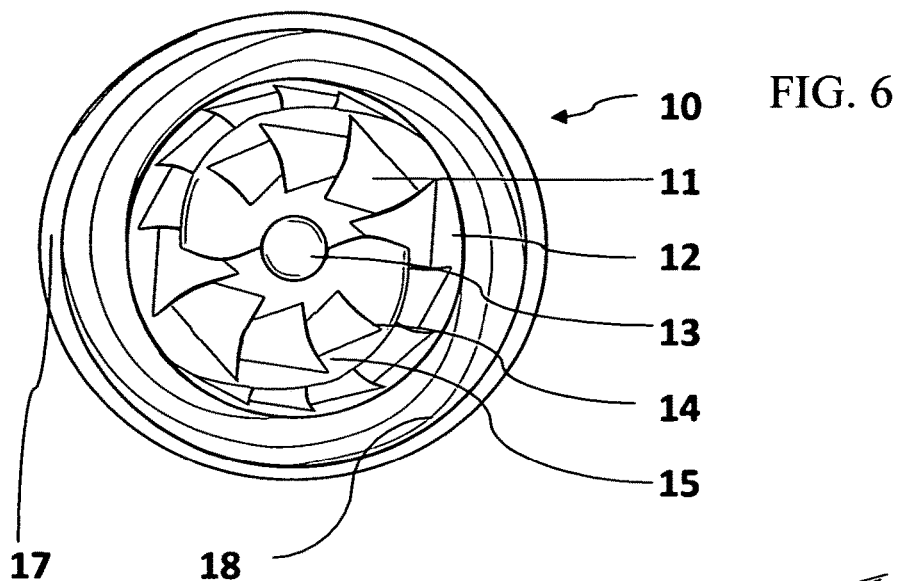
FIG. 6 is a perspective view of the intake of an alternate embodiment of the intake end of the spiral turbine blade having at least one concave compartment.

FIG. 6 illustrates a perspective view of an alternate embodiment of the intake end of the spiral turbine blade having at least one concave compartment 10. The spiral turbine blade having at least one concave compartment 10 consists of a plurality of components. One of these components is at least one spiral turbine blade 12. Attached to the side of the at least one spiral turbine blade 12 which faces the oncoming moving fluid is at least one concave compartment 11. The at least one concave compartment 11 may include at least one intake void 14 and at least one interior space 23. The at least one concave compartment 11 may be oriented so that the at least one intake void 14 is aligned to capture an augmented range of velocity vectors of the moving fluid. Said at least one concave compartment 11 is connected to the intake-facing side of the at least one spiral turbine blade 12 with said at least one intake void 14. The at least one concave compartment 11 may have at least one exit void 15 that is less than or equal in total area to said at least one intake void 14. Said at least one exit void 15 may be oriented so that the moving fluid exiting is channeled towards the at least one intake void 14 of the most proximal at least one concave compartment 11 downstream if one is present. The at least one spiral turbine blade 12 may be attached to an at least one shaft 13, thereby causing the at least one shaft 13 to rotate when said moving fluid drives the rotation of the at least one spiral turbine blade 12. The at least one shaft 13 may then be geared to a generator, directly and or indirectly, for the production of electrical energy. Said at least one shaft 13 may be secured by at least one ball-bearing, magnetic, or other low-friction harness 20, which may then be attached to at least one stationary structure 16. The at least one stationary structure 16 may then be connected to at least one intake shroud 17, thereby augmenting the velocity of the moving fluid entering the at least one stationary structure 16. The at least one intake shroud 17 may include at least one spiral depression, vane, and or other vortex-inducing apparatus 18 along its interior wall, thereby inducing a vortex on the moving fluid as it passes through the at least one intake shroud 17.

Figure 7:
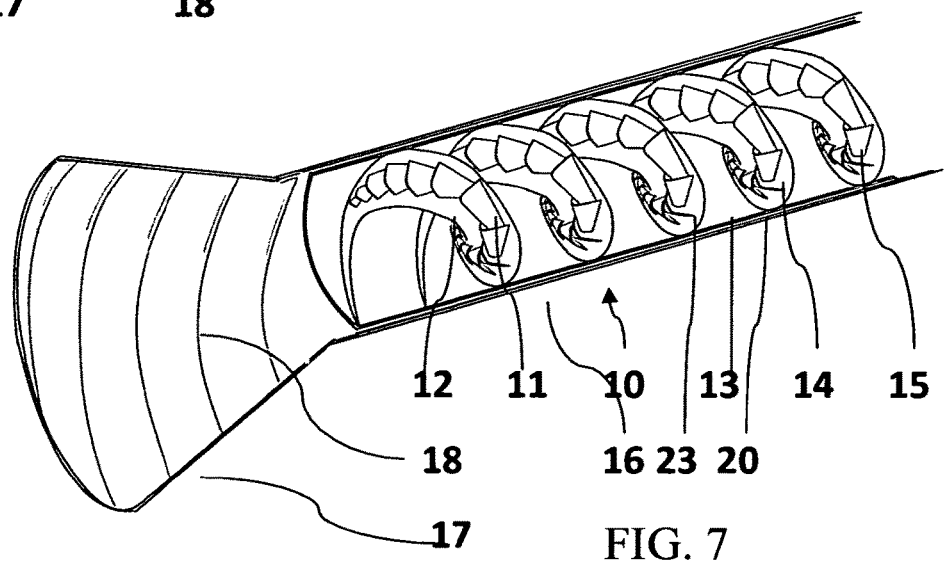
FIG. 7 is a cross-sectional perspective view of an alternate embodiment of the spiral turbine blade having at least one concave compartment.

FIG. 7 illustrates a cross-sectional perspective view of an alternate embodiment of the spiral turbine blade having at least one concave compartment 10. The spiral turbine blade having at least one concave compartment 10 consists of a plurality of components. One of these components is at least one spiral turbine blade 12. Attached to the side of the at least one spiral turbine blade 12 which faces the oncoming moving fluid is at least one concave compartment 11. The at least one concave compartment 11 may include at least one intake void 14 and at least one interior space 23. The at least one concave compartment 11 may be oriented so that the at least one intake void 14 is aligned to capture an augmented range of velocity vectors of the moving fluid. Said at least one concave compartment 11 is connected to the intake-facing side of the at least one spiral turbine blade 12 with said at least one intake void 14. The at least one concave compartment 11 may have at least one exit void 15 that is less than or equal in total area to said at least one intake void 14. Said at least one exit void 15 may be oriented so that the moving fluid exiting is channeled towards the at least one intake void 14 of the most proximal at least one concave compartment 11 downstream if one is present. The at least one spiral turbine blade 12 may be attached to at least one shaft 13. Said at least one shaft 13 may be secured by a ball-bearing, magnetic, or other low-friction harness 20, which may then be attached to at least one stationary structure 16. The at least one stationary structure 16 may then be connected to at least one intake shroud 17, thereby augmenting the velocity of the moving fluid entering the at least one stationary structure 16. The at least one intake shroud 17 may include at least one spiral depression, vane, and or other vortex-inducing apparatus 18 along its interior wall, thereby inducing a vortex on the moving fluid as it passes through the intake shroud 17. By inducing said vortex on the moving fluid, an augmented percentage of the velocity vectors of the moving fluid are aligned with the at least one intake void 14 of the at least one concave compartment 11, thereby augmenting the conversion efficiency of the spiral turbine blade having at least one concave compartment 10.

Figure 8:
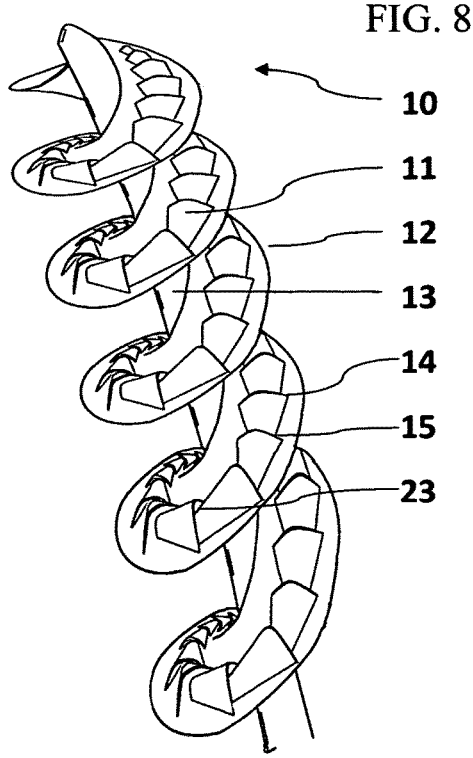
FIG. 8 is a perspective view of an alternate embodiment of the spiral turbine blade having at least one concave compartment.

FIG. 8 illustrates a perspective view of an alternate embodiment of the spiral turbine blade having at least one concave compartment 10. The spiral turbine blade having at least one concave compartment 10 consists of a plurality of components. One of these components is at least one spiral turbine blade 12. The at least one spiral turbine blade 12 may decrease at a logarithmic rate in terms of number of rotations around the axis of rotation per unit of length of the axis of. Attached to the side of the at least one spiral turbine blade 12 which faces the oncoming moving fluid is at least one concave compartment 11. The at least one concave compartment 11 may include at least one intake void 14 and at least one interior space 23. The at least one concave compartment 11 may be oriented so that the at least one intake void 14 is aligned to capture an augmented range of velocity vectors of the moving fluid. Said at least one concave compartment 11 is connected to the intake-facing side of the at least one spiral turbine blade 12 with said at least one intake void 14. The at least one concave compartment 11 may have at least one exit void 15 that is less than or equal in total area to said at least one intake void 14. Said at least one exit void 15 may be oriented so that the moving fluid exiting is channeled towards the at least one intake void 14 of the most proximal at least one concave compartment 11 downstream if one is present. Said at least one spiral turbine blade 12 may be attached to an at least one shaft 13.

Figure 9:
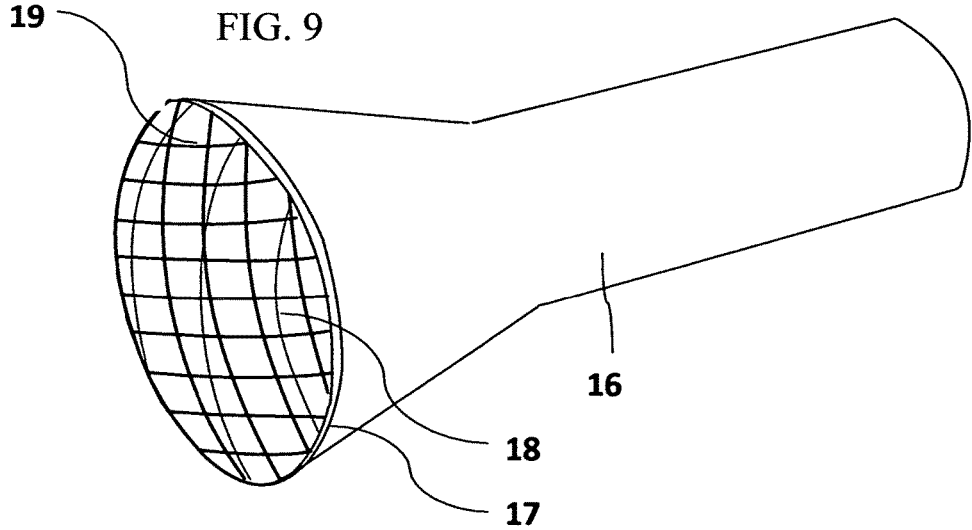
FIG. 9 is a perspective view of an alternate embodiment of the spiral turbine blade having at least one concave compartment.

FIG. 9 illustrates a perspective view of an alternate embodiment of the spiral turbine blade having at least one concave compartment. The spiral turbine blade having at least one concave compartment 10 may include at least one stationary structure 16 which houses the at least one spiral turbine blade 12, at least one concave compartment 11, etc. Attached to the at least one stationary structure 16 is an at least one intake shroud 17, which augments the velocity of the moving fluid entering the at least one stationary structure 16. The interior wall of the at least one intake shroud 17 may have at least one spiral depression, vane, and or other vortex-inducing apparatus 18, which induces the moving fluid into a vortex. Said vortex augments the conversion efficiency of the at least one concave compartment 11 by orienting an increased amount of the velocity vectors of the moving fluid with the at least one intake void 14 of the least one concave compartment 11. The spiral turbine blade 12 may include at least one grille 19 attached to the intake end, which has voids less than or equal in area to said at least one exit void 15, thereby deterring any debris or wildlife too large to pass through safely.

Figure 10:
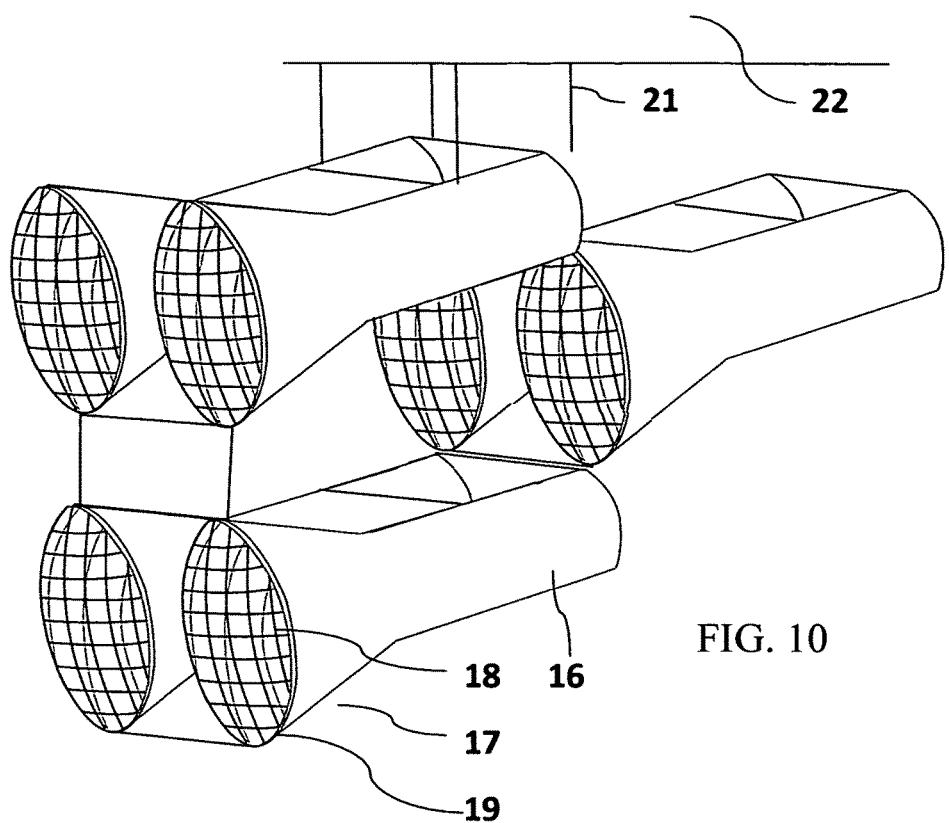
FIG. 10 is a perspective view of the spiral turbine blade having at least one concave compartment, which is connected to a multitude in an optimal formation.

FIG. 10 illustrates a perspective and operational view of the spiral turbine blade having at least one concave compartment 10, which is connected to others in an optimal formation. The spiral turbine blade having at least one concave compartment 10 may include at least one stationary structure 16 which houses the at least one spiral turbine blade 12, at least one concave compartment 11, etc. Attached to the at least one stationary structure 16 is an at least one intake shroud 17, which augments the velocity of the moving fluid entering the at least one stationary structure 16. The interior wall of the at least one intake shroud 17 may have at least one spiral depression, vane, and or other vortex-inducing apparatus 18, which acts as rifling, inducing the moving fluid into a vortex. Said vortex augments the conversion efficiency of the at least one concave compartment 11 by orienting an increased amount of the velocity vectors of the moving fluid with the at least one intake void 14 of the least one concave compartment 11. The spiral turbine blade may include at least one grille 19 attached to the intake end, which has voids less than or equal in diameter to the at least one exit void 15, thereby deterring any debris or wildlife from entering that are too large to safely pass through. The spiral turbine blade having at least one concave compartment 10 may include at least one supporting connection 21 to maintain a stationary position. Said at least one supporting connection 21 may be comprised of metal, plastic, carbon fiber, rope, rubber, and or other suitable material. The at least one supporting connection 21 may be attached to an anchoring structure 22 such as an oil rig, seafloor, bedrock, or other structure suitable to provide stability for the spiral turbine blade having at least one concave compartment 10.

What is claimed is:

1. At least one spiral turbine blade having at least one external concave compartment, said at least one spiral turbine blade comprising:
    wherein said at least one external concave compartment, in which said at least one external concave compartment comprises at least one intake void and at least one interior space, and is projecting from an intake-facing edge of said at least one spiral turbine blade.

2. The at least one spiral turbine blade having at least one external concave compartment as in claim 1, in which said at least one external concave compartment has at least one exit void.

3. The at least one spiral turbine blade having at least one external concave compartment as in claim 1, in which said at least one external concave compartment terminates within said at least one interior space of the proceeding at least one external concave compartment, if there is another proceeding at least one external concave compartment in the arrangement, thereby orienting said at least one external concave compartment in an overlapping fashion.

4. The at least one spiral turbine blade having at least one external concave compartment as in claim 1, in which said at least one spiral turbine blade is connected to at least one stationary structure.

5. The at least one spiral turbine blade having at least one external concave compartment as in claim 1, in which at least one intake shroud is positioned upstream from said at least one spiral turbine blade.

6. The at least one spiral turbine blade having at least one external concave compartment as in claim 5, in which said at least one intake shroud has at least one spiral depression or vane.

7. The at least one spiral turbine blade having at least one external concave compartment as in claim 1, in which said at least one spiral turbine blade is connected to at least one structure via at least one ball-bearing or magnetic bearing, which allows for the rotation of said at least one spiral turbine blade.

8. The at least one spiral turbine blade having at least one external concave compartment as in claim 1, in which said at least one spiral turbine blade is connected to at least one shaft.

9. The at least one spiral turbine blade having at least one external concave compartment as in claim 1, in which said at least one spiral turbine blade having at least one external concave compartment is connected to at least one generator.

10. The at least one spiral turbine blade having at least one external concave compartment as in claim 1, in which said at least one spiral turbine blade having at least one external concave compartment is comprised of plastic, carbon fiber, metal, wood, rubber, or foam.

11. The at least one spiral turbine blade having at least one external concave compartment as in claim 1, in which the width and or frequency of rotations around the axis of rotation per length of the axis of rotation of said at least one spiral turbine blade having at least one external concave compartment changes at a logarithmic or constant rate.

12. The at least one spiral turbine blade having at least one external concave compartment as in claim 1, in which said at least one spiral turbine blade having at least one external concave compartment is hollow.

13. The at least one spiral turbine blade having at least one external concave compartment as in claim 1, in which said at least one spiral turbine blade having at least one external concave compartment is connected to at least one additional spiral turbine blade having at least one external concave compartment.

* * * * *